United States Patent [19]

Yoon

[11] Patent Number: 4,600,569
[45] Date of Patent: *Jul. 15, 1986

[54] FLUE GAS DESULFURIZATION PROCESS

[75] Inventor: Heeyoung Yoon, McMurray, Pa.

[73] Assignee: Conoco Inc., Wilmington, Del.

[*] Notice: The portion of the term of this patent subsequent to Jul. 15, 2003, has been disclaimed.

[21] Appl. No.: 714,741

[22] Filed: Mar. 22, 1985

[51] Int. Cl.$^4$ ............................................. C01B 17/00
[52] U.S. Cl. ..................................... 423/243; 423/242
[58] Field of Search ............... 423/242 A, 242 R, 243, 423/244 A, 244 R

[56] References Cited

U.S. PATENT DOCUMENTS 3,632,306  1/1972  Villiers-Fisher et al. ............ 423/242
4,080,428  3/1978  Holter et al. ........................ 423/242
4,279,873  7/1981  Felsvang et al. .................... 423/242
4,533,532  8/1985  Gebhard et al. ..................... 423/244

Primary Examiner—Gregory A. Heller
Attorney, Agent, or Firm—William A. Mikesell, Jr.; Cortlan R. Schupbach

[57] ABSTRACT

An aqueous solution of an alkaline earth salt of a low molecular weight carboxylic acid, such as calcium formate, is sprayed into a sulfur dioxide containing flue gas upstream of a solids particulate separator in amount sufficient to produce a flue gas temperature at least about 10° C. above its dew point at the separator.

3 Claims, No Drawings

FLUE GAS DESULFURIZATION PROCESS

FIELD OF THE INVENTION

This invention is directed to an improved process for reducing the sulfur content of flue gas derived from combustion of a sulfur-containing fuel, in which process an aqueous solution containing an alkaline earth metal formate or acetate is sprayed into such flue gas in a manner as to form a dry powder, which powder is subsequently separated from the flue gas.

BACKGROUND OF THE INVENTION

Efforts to reduce sulfur emissions in the gaseous products from combustion of a sulfur-containing fuel have been made in varying directions. Some processes attempt to reduce or eliminate the sulfur in the fuel prior to its combustion. Other processes propose the addition of compounds to the combustion zone which will in some manner change the nature of the sulfur compounds such that they may be more readily removed from the combustion products. And yet other processes remove sulfur compounds from the gaseous combustion products by chemical reaction.

This latter approach of chemical treatment to effect flue gas desulfurization can be further subdivided into wet scrubbing wherein a solution or suspension of reagent both enters and leaves the flue gas contacting zone in liquid state, spray drying wherein a solution or suspension of reagent enters the flue gas contacting zone in liquid state but is dried to produce a powdered solid leaving the contacting zone, and dry treatment wherein the treating reagent is a solid state powder both entering and leaving the contacting zone.

Illustrative of the wet scrubber approach is U.S. Pat. No. 3,928,537, issued Dec. 23, 1975 to Saitoh et al, which discloses contacting the exhaust gas with an aqueous solution of an organic acid to form a soluble sulfite or sulfate. The sulfite or sulfate is removed, and the organic acid regenerated, by a second step comprising reaction with a calcium compound such as an inorganic or an organic acid salt, for example calcium hydroxide or calcium formate.

The spray dryer approach is illustrated for example by U.S. Pat. No. 4,279,873, issued July 21, 1981 to Felsvang et al, which discloses spraying a suspension of fresh slaked lime and recycled fly ash plus spent calcium compound into the hot flue gas in such a manner as to evaporate the slurry droplets to dryness; the resulting powdered solids are removed from the flue gas by a downstream electrostatic precipitator or bag filter.

U.S. Pat. No. 4,178,349, issued Dec. 11, 1979 to Wienert illustrates the dry treatment; it discloses mixing a dry, powdered lime-bearing material in a reactor, and subsequently separating the solids from the treated flue gas.

Current thinking seems to be that no one of the above-discussed strategies is the unique answer to the sulfur emission problem, either for new installations or for retrofit on an existing installation. Rather, numerous site-specific factors such as proximity to reagent source, space availability, and extent of sulfur removal required, must enter into the selection at each plant.

SUMMARY OF THE INVENTION

It is an objective of the present invention to provide a novel and advantageous method of removing sulfur compounds, especially sulfur dioxide, from combustion exhaust gas.

According to the present invention, flue gas is desulfurized by contacting it with a fine spray of a solution of an alkaline earth metal salt of a low molecular weight carboxylic acid, the contacting being under conditions to produce a finely divided dried solid. The fine solid is subsequently separated from the flue gas.

Salts contemplated for preparation of the treating solution according to the present invention are the calcium and magnesium salts of formic and acetic acids.

DETAILED DESCRIPTION OF THE INVENTION

Flue gas containing sulfur dioxide from combustion of a sulfur-containing fuel is typically passed from the combustion chamber through heat recovery exchangers and thence by way of duct work to a stack for disposal. Where the fuel is a solid, such as coal, or a heavy liquid, the combustion product gases will also contain ash solids such as fly ash, in which instance the flue gas will first be treated for solids removal by such as a bag filter or electrostatic precipitator (ESP) prior to being passed to the stack.

The process of the present invention is especially adapted to remove sulfur dioxide from a flue gas wherein availability of relatively short residence time in the duct work upstream of the ESP and/or a relatively high concentration of sulfur dioxide combine to present difficult removal. The presently preferred compound for the treating solution is calcium formate. A solution of calcium formate is sprayed into the duct work upstream of the solids removal device, e.g. bag house or ESP. As the droplets of the sorbent solution dry up, the flue gas humidity is increased and its temperature is reduced. The net result is a closer approach to dew point of the flue gas humidity. The concentration of the solution is determined by two principal factors, viz. the approach to dew point, and the desired Ca/S ratio.

It is necessary for several reasons to control the humidity, or approach to dew point, of the flue gas after the drying phase of the droplets. It is preferable to approach the dew point at the inlet to the solids collector as close as possible without causing operating problems, since a more humid flue gas permits a longer existence of the droplets, and the reaction of gaseous sulfur dioxide with liquid calcium solution is much more rapid than with a solid formate particle. On the other hand, if the dew point is approached too closely, the spray droplets produce wet particles, and thus tend to foul and plug the surfaces of bag filters or ESP collector plates, and to cause excessive corrosion of duct work. I prefer the humidification to approach to within no nearer than about 10C.° of the saturation temperature.

The degree of desulfurization achieved is also controlled by the Ca/S ratio, i.e. the amount of calcium compound in the treating spray as compared to the amount of sulfur dioxide in the flue gas being treated. This ratio is normally expressed in moles, and I prefer that it be in the range from about 0.5:1 to about 3:1. Solubility of the treating salt, e.g. calcium formate, in water determines the maximum concentration of treating liquid in solution form, and thus the maximum possible Ca/S ratio is lower for a flue gas of higher sulfur dioxide content. When treating a flue gas at about 175° C. containing about 1500 ppmv (dry basis) $SO_2$ and an initial absolute humidity of about 5 vol. %, a concentrated solution of calcium formate can be sprayed in amount sufficient to achieve about a 1.2 Ca/S ratio at the desired 10° C. approach.

If one wishes to use a higher Ca/S ratio than is feasible by solution, then additional calcium compound, such as calcium formate, oxide, or hydroxide, can be injected as a dry powder into the flue gas. In such instance, it is preferred that the dry powder be added to the flue gas at a point upstream of the solution injection point. In any event, it is advantageous that the duct work provides a residence time of at least about 1 second, and preferably more.

In the usual application of this invention, the sulfur-containing fuel being burned will also contain a significant proportion of ash-forming constituents, and thus the flue gas will contain fly ash. Addition of treating solution and optionally dry powder according to the present invention causes an increase in the solids loading of the flue gas, and thus on the duty to be served by the downstream solids collector bag house or ESP. However, it has been determined that the solids retained on the surfaces of such solids collector remain active for $SO_2$ absorption for a longer period when derived from a formate solution than from a solids suspension, particularly when the desired close dew point approach is maintained. The formate derived solids are more reactive because they are finer and have larger specific surface area. Additionally, the collected solids contain some non-reacted calcium values, in addition to the fly ash and sulfite and sulfate compounds, which values can be reclaimed.

The temperature of the flue gas at the point of injection of the treating solution should be between about 120° and about 230° C., and preferably between about 140° and about 175° C.

The invention will now be illustrated by the following examples.

EXAMPLE I

A flue gas from an electrical utility station burning 2.4 weight percent sulfur coal is analyzed at a point just downstream of the air preheater. The flue gas analysis is as follows: temperature 175° C., water content 5 volume percent, sulfur dioxide 1500 ppmv (dry), oxygen 5.5 volume %, and solids (fly ash) content 2.5 grains per dscf. Into this flue gas is sprayed, at the same point just downstream of the air preheater, a solution of 14 weight percent calcium formate in water. The flue gas velocity in the existing duct is such that the solution droplets have a residence time of about 2 seconds prior to passage into the ESP. The solution is added in amount to achieve a molar Ca/S ratio of about 1.2, which results in a relative humidity at the ESP inlet of about 10° C. above the dew point. The $SO_2$ content of the gas exit the ESP is reduced to 300 ppmv (dry).

EXAMPLE II

The test of Example I is repeated, except that calcium acetate solution is substituted for the calcium formate solution. Results similar to those of Example I are obtained.

EXAMPLE III

A flue gas having an $SO_2$ content of about 2400 ppmv (dry) is treated in the utility station of Example I. In order to achieve the desired Ca/S ratio of 1.6, it is necessary to inject dry slaked lime, in addition to the calcium formate solution, in a mole ratio of lime calcium to formate calcium of about 1.2. Sulfur dioxide content of the flue gas exit the ESP is about 500 ppmv (dry).

Reasonable modification is possible within the scope of this disclosure and the appended claims.

What is claimed is:

1. The method for reducing sulfur dioxide content of a flue gas resulting from combustion of a sulfur-containing fuel, which method comprises:
   (a) spraying into said flue gas, at a point where its temperature is between about 120° and about 230° C., an aqueous solution of a calcium salt of a low molecular weight carboxylic acid, said acid being selected from formic and acetic;
   (b) providing a contact time between said flue gas and droplets resulting from said spraying of at least about 1 second;
   (c) subsequently separating from said flue gas solids resulting from drying of said droplets and solids resulting from combustion of said fuel;
   (d) discharging from said separating a flue gas of substantially diminished sulfur dioxide content; and
   (e) regulating the rate of said spraying relative to the rate of said flue gas such that the temperature of said flue gas at the point of said separating is at least about 10° C. above its saturation temperature.

2. The method of claim 1 wherein said salt comprises calcium formate.

3. The method of claim 2 wherein additionally sorbent selected from calcium formate, oxide, and hydroxide is introduced in dry finely divided form into said flue gas at a point upstream of said spraying.

* * * * *